United States Patent
Choo

(10) Patent No.: US 9,991,534 B2
(45) Date of Patent: Jun. 5, 2018

(54) METHOD AND APPARATUS FOR RECOVERING PERFORMANCE OF FUEL CELL STACK

(71) Applicant: HYUNDAI MOTOR COMPANY, Seoul (KR)

(72) Inventor: Hyun Suk Choo, Yongin-Si (KR)

(73) Assignee: Hyundai Motor Company, Seoul (KR)

( * ) Notice: Subject to any disclaimer, the term of this patent is extended or adjusted under 35 U.S.C. 154(b) by 320 days.

(21) Appl. No.: 14/955,672

(22) Filed: Dec. 1, 2015

(65) Prior Publication Data

US 2016/0344049 A1 Nov. 24, 2016

(30) Foreign Application Priority Data

May 18, 2015 (KR) .................. 10-2015-0068676

(51) Int. Cl.
*H01M 8/04* (2016.01)
*H01M 8/04746* (2016.01)
(Continued)

(52) U.S. Cl.
CPC ......... *H01M 8/04753* (2013.01); *H01M 8/02* (2013.01); *H01M 8/0488* (2013.01); *H01M 8/04089* (2013.01); *H01M 8/04238* (2013.01); *H01M 8/24* (2013.01); *H01M 2008/1095* (2013.01)

(58) Field of Classification Search
CPC ............... H01M 8/04753; H01M 8/02; H01M 8/04089; H01M 8/04238; H01M 8/0488; H01M 8/24; H01M 2008/1095
See application file for complete search history.

(56) References Cited

U.S. PATENT DOCUMENTS 6,881,510 B1 4/2005 Gyoten et al.
2006/0003204 A1* 1/2006 Callahan ........... H01M 8/04007
429/415
(Continued)

FOREIGN PATENT DOCUMENTS

JP 2009-277637 A 11/2009
JP 2010-114040 A 5/2010
(Continued)

OTHER PUBLICATIONS

Extended European Search Report issued in Application No. 15197708.9 dated Oct. 18, 2016.

*Primary Examiner* — Raymond Alejandro
(74) *Attorney, Agent, or Firm* — McDermott Will & Emery LLP

(57) ABSTRACT

A method for recovering performance of a fuel cell stack includes 1) a first pulse operation process including i) generating a hydrogen pumping reaction in a cathode by applying a current to the cathode after a supply of air to the cathode stops and ii) maintaining an OCV (open circuit voltage) by again supplying air to the cathode after the hydrogen pumping is performed, 2) a pole substitution process of substituting a pole of the fuel cell stack, and 3) a second pulse operation process including iii) generating the hydrogen pumping reaction in the cathode after the pole substitution, and iv) maintaining the OCV (open circuit voltage) by supplying air to the cathode after the pole substitution after the hydrogen pumping is performed.

10 Claims, 8 Drawing Sheets

AIR BRAKING + HIGH HUMIDITY
CYCLE OPERATION
(OCV <-> CATHODE HYDROGEN PUMPING,
w/50A 6 TIMES/30 MINUTES)

IN ADDITION TO Pt-OXIDE REDUCTION,
1, ANODE $SO_2$, $SO_5-$ DESORPTION
$Pt-SO_2 \rightarrow Pt-S \rightarrow Pt-SO_4^{2-} \rightarrow Pt$ AIR BRAKING + POLE SUBSTITUTION +
HIGH HUMIDITY CYCLE OPERATION
(OCV <-> ANODE HYDROGEN PUMPING,
w/50A 6 TIMES/30 MINUTES)

IN ADDITION TO Pt-OXIDE REDUCTION,
1, ANODE $SO_5-$ DESORPTION : $Pt-SO_5- \rightarrow Pt$
2, ANODE CO DESORPTION : $Pt-CO \rightarrow Pt$

(51) Int. Cl.
*H01M 8/04223* (2016.01)
*H01M 8/02* (2016.01)
*H01M 8/04089* (2016.01)
*H01M 8/04858* (2016.01)
*H01M 8/24* (2016.01)
*H01M 8/1018* (2016.01)

(56) References Cited

U.S. PATENT DOCUMENTS

| | | |
|---|---|---|
| 2008/0257621 A1* | 10/2008 | Saeki .................... B60L 11/005 180/65.31 |
| 2009/0286112 A1 | 11/2009 | Oh et al. |
| 2010/0092819 A1 | 4/2010 | Umayahara et al. |
| 2010/0119887 A1 | 5/2010 | Yamamoto |
| 2012/0148929 A1 | 6/2012 | Jia et al. |
| 2012/0225330 A1 | 9/2012 | Umayahara et al. |
| 2012/0315559 A1* | 12/2012 | Noh .................. H01M 8/04992 429/431 |
| 2014/0038068 A1 | 2/2014 | Shin et al. |
| 2014/0170517 A1* | 6/2014 | Passot ............... H01M 8/04223 429/444 |
| 2015/0118598 A1 | 4/2015 | Choo |

FOREIGN PATENT DOCUMENTS

| | | |
|---|---|---|
| KR | 10-0429040 B1 | 4/2004 |
| KR | 10-2009-0096649 A | 9/2009 |
| KR | 10-2014-0017364 A | 2/2014 |
| KR | 10-2015-0043181 A | 4/2015 |
| KR | 10-2015-0050289 A | 5/2015 |

* cited by examiner

FIG.2

METHOD AND APPARATUS FOR RECOVERING PERFORMANCE OF FUEL CELL STACK

CROSS-REFERENCE TO RELATED APPLICATION

This application claims the benefit of priority to Korean Patent Application No. 10-2015-0068676, filed on May 18, 2015 with the Korean Intellectual Property Office, the disclosure of which is incorporated herein in its entirety by reference.

TECHNICAL FIELD

The present disclosure relates to a method and an apparatus for recovering performance of a fuel cell stack by simultaneously removing oxides and adsorbed impurities on a catalytic surface in an aged fuel cell stack, and more particularly, to a method and an apparatus for recovering performance of a fuel cell stack by continuously changing a high voltage pole of an aged fuel cell stack and alternately generating an OCV ↔ hydrogen pumping reaction in a cathode and an anode by a continuous pulse scheme.

BACKGROUND

A polymer electrolyte membrane fuel cell (PEMFC) for a vehicle may have reduced performance due to deterioration of an electrode (Pt/C, platinum supported in a carbon support) configuring a membrane electrolyte assembly (MEA) and a membrane after it is operated for a predetermined time. In particular, an oxide film (Pt-oxide) formed on a platinum surface of a cathode having several nano particle size has been known as having an effect of hindering reaction O from being adsorbed onto the platinum surface to reduce an oxygen reduction reaction (ORR) rate of the cathode. CO of several ppm included in fuel is chemically adsorbed into platinum of an anode, which leads to reduced hydrogen oxidation reaction (HOR) efficiency. Further, a local increase in temperature occurring during a high power and low humidity operation shrinks a pore structure of the membrane or rearranges an $SO^-$ terminal group to cause a reduction in ion conductivity. It has been reported that the $SO^-$ terminal group of a binder causes specific adsorption of an anion into a surface of a platinum catalyst under the low humidity operation conditions to reduce catalyst activation. The SO in air poisons a cathode catalyst to reduce the catalyst activation. Since the reduction in performance of the fuel cell stack due to a change in an internal structure of an electrode membrane is due to a reversible deterioration, the performance of the fuel cell stack may be partially recovered. However, research or patents thereon are seldom reported.

The present applicant has tried various methods for improving the reduction in performance of the fuel cell stack due to the reversible deterioration as described above. As the methods, there are a "method for recovering performance of a fuel cell by a hydrogen storage method (Patent Laid-Open Publication No. 10-2014-0017364)" to supply H of high temperature (70° C.) to a cathode and seal and store both of an anode/cathode under hydrogen atmosphere for 12 hours, a "method for recovering performance of a fuel cell stack by air braking (Patent Application No. 10-2013-0146740)" to supply hydrogen to an anode (at the same time, with a stop of air supply) and then continuously applying a load of 5 to 10 A to induce hydrogen pumping to a cathode, a "method for recovering performance of a fuel cell stack by a reverse potential pulse (Patent Application No. 10-2013-0131495)" to substitute a pole and then apply a high output pulse load in a state in which air is supplied to an anode and hydrogen is supplied to a cathode. All the methods as described above induce the generation of hydrogen to the cathode side to accelerate a reduction in platinum oxide. However, all the methods do not yet effectively improve the deterioration due to impurities such as CO and $SO^-$ adsorbed into the platinum catalyst of the anode among the deterioration causes of performance of the fuel cell.

SUMMARY

The present disclosure has been made to solve the above-mentioned problems occurring in the prior art while advantages achieved by the prior art are maintained intact.

An aspect of the present disclosure provides a method and an apparatus for recovering performance of a fuel cell stack for simultaneously removing platinum oxides of both of an anode and a cathode and impurities such as CO, S, and SO-adsorbed onto a surface which may not be solved well by the existing method for recovering performance of a fuel cell.

According to an exemplary embodiment of the present disclosure a method for recovering performance of a fuel cell stack, includes: 1) a first pulse operation process including i) generating a hydrogen pumping reaction in a cathode by applying a current to the cathode after a supply of air to the cathode stops; and ii) maintaining an OCV (open circuit voltage) by again supplying air to the cathode after the hydrogen pumping is performed; 2) a pole substitution process of substituting a pole of the fuel cell stack; and 3) a second pulse operation process including iii) generating the hydrogen pumping reaction in the cathode after the pole substitution by applying a current to the cathode after the supply of air to the cathode stops after the pole substitution; and iv) maintaining the OCV (open circuit voltage) by supplying air to the cathode after the pole substitution after the hydrogen pumping is performed.

In the pulse operation process of the 1) or 3), the i) and ii) or the iii) and iv) may be repeatedly performed and the i) and ii) or the iii) and iv) each may be repeatedly performed 5 to 10 times.

The 2) pole substitution process and the 3) second pulse operation process may be repeatedly performed to alternately remove continuously platinum oxides and impurities remaining at both poles. After the 1) to 3) processes are completed in 1 cycle, the 2) and 3) processes may be repeated several times.

The pole substitution process may include supplying hydrogen to an anode after the pole substitution and supplying air to the cathode after the pole substitution. The supplied hydrogen may be saturated hydrogen of 65 to 75° C., most preferably, saturated hydrogen of 70° C. and the supplied air may be a saturated air of 65 to 75° C., preferably, a saturated air of 70° C. The air may be supplied along with a cooling water of 10 to 15° C.

The generating of the hydrogen pumping reaction of the i) or iii) may include continuously applying a load of 0.1 $A/cm^2$ for 3 to 5 minutes in a state in which the supply of air stops. The maintaining of the OCV of the ii) or iv) may be performed for 0.5 to 1.5 minutes. The 1) first pulse operation process including the i) and ii) or the 3) second pulse operation process including the iii) and iv) may be performed 6 times for a total of 30 minutes by a pulse scheme.

According to an exemplary embodiment of the present disclosure, an apparatus for recovering performance of a fuel cell stack includes: a fuel cell stack having a solid polymer electrolyte membrane between an anode and a cathode; a supply gas flow change mechanism changing a flow of hydrogen and air supplied to the fuel cell stack; and a current flow change mechanism changing a pole of the fuel cell stack; a gas cutting off mechanism cutting off a flow of air to the cathode.

The supply gas flow change mechanism may be a 3-way valve. The current flow change mechanism may be a contact type relay. The supply gas flow change mechanism and the current flow change mechanism may be automatically operated while interlocked with each other.

The apparatus for recovering performance of a fuel cell stack according to the exemplary embodiment of the present disclosure does not have to desorb/reconnect the pipe and dismantle/reconnect the high voltage cable, thereby shortening the recovery time of performance of the fuel cell and saving efforts and costs required to recover the performance.

BRIEF DESCRIPTION OF THE DRAWINGS

The above and other objects, features and advantages of the present disclosure will be more apparent from the following detailed description taken in conjunction with the accompanying drawings.

FIG. 2 is a diagram schematically illustrating a method for recovering performance of a fuel cell stack according to an exemplary embodiment of the present disclosure;

DETAILED DESCRIPTION

A method for recovering performance of a fuel cell stack according to an exemplary embodiment of the present disclosure is to recover the performance of the fuel cell stack by inducing an OCV (open circuit voltage, non-load voltage) ↔ hydrogen pumping reaction to an electrode in a pulse form while continuously changing a high voltage pole of the aged fuel cell stack.

Figure 1:
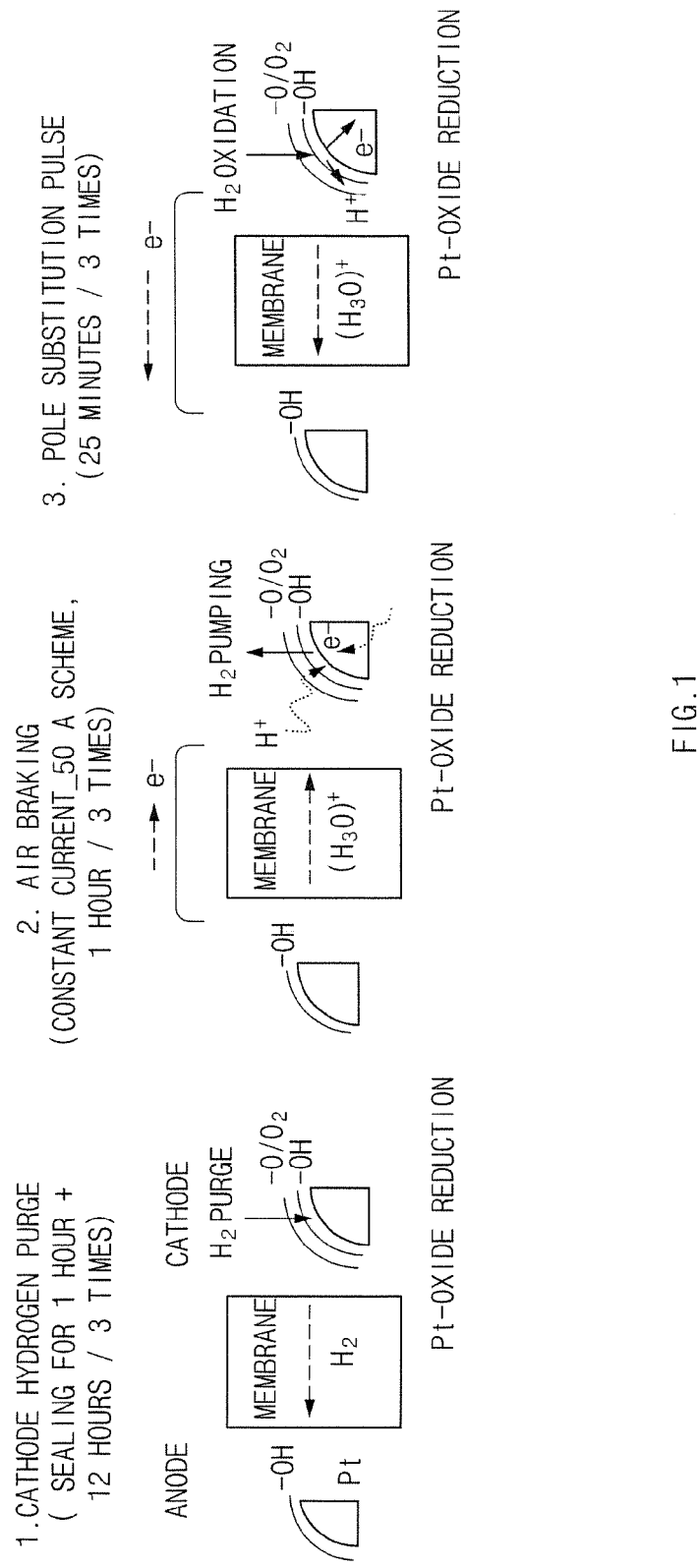
FIG. 1 is a diagram schematically illustrating the existing method for recovering performance of a fuel cell stack.
Figure 2:
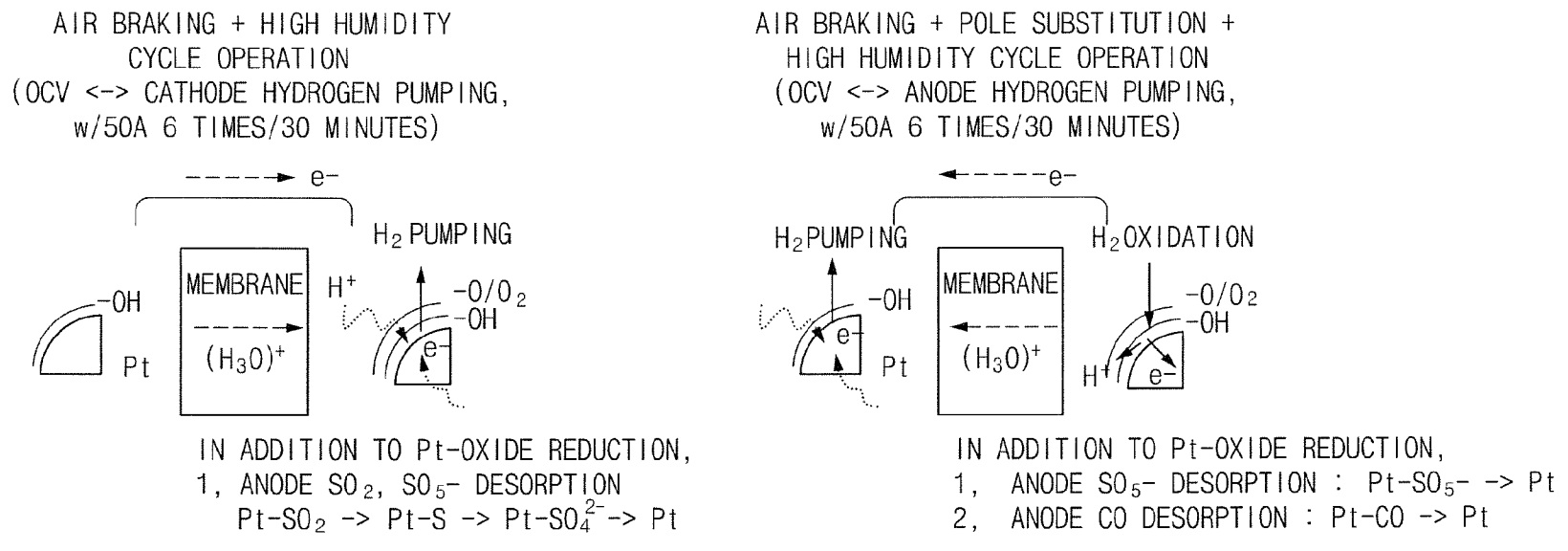

The present disclosure improves the existing method for recovering performance of a fuel cell stack focused on a reduction of platinum (Pt) oxides (Pt—OH, Pt—O, etc.) to desorb Pt—SO and Pt—SO⁻ from a cathode and desorb Pt—SO and Pt—CO from an anode, such that the present disclosure may have a 10% or more increase in a recovery rate of performance of a fuel cell compared to the existing method (see FIGS. 1 and 2).

As illustrated in FIG. 2, to simultaneously remove platinum oxides and impurities adsorbed onto a platinum surface of both of the anode and the cathode, the present disclosure discloses what we call a dynamic method for recovering performance of a fuel cell stack including a hydrogen pumping process by air braking, a pole substituting process, and a high humidity cycle operation process.

Describing in more detail the method for recovering performance of a fuel cell stack according to the exemplary embodiment of the present disclosure, in a fuel cell stack aged due to long-term use, hydrogen is supplied to an anode and air is supplied to the cathode, and a load is applied in a state in which the air supply stops (air braking) to generate hydrogen pumping in the cathode. The hydrogen may preferably be saturated hydrogen of 65 to 75° C. and the air may preferably be saturated air of 65 to 75° C. Cooling water of 10 to 15° C. is supplied as soon as air is supplied, such that condensed water may be generated on a reaction surface of the fuel cell stack as much as possible. Only when a performance recovery test is performed in the state in which high humidity conditions are maintained, ions such as $SO^{2-}$ may be desorbed at a hydrogen pumping potential and easily discharged to an outside of a cell. Further, for the hydrogen pumping generation, cooling water and hydrogen are continuously supplied and a load of 0.1 A/cm² is continuously applied for 3 to 5 minutes in the state in which only the supply of air stops. In this case, a cell potential reaches about −0.1 V.

Figure 3:
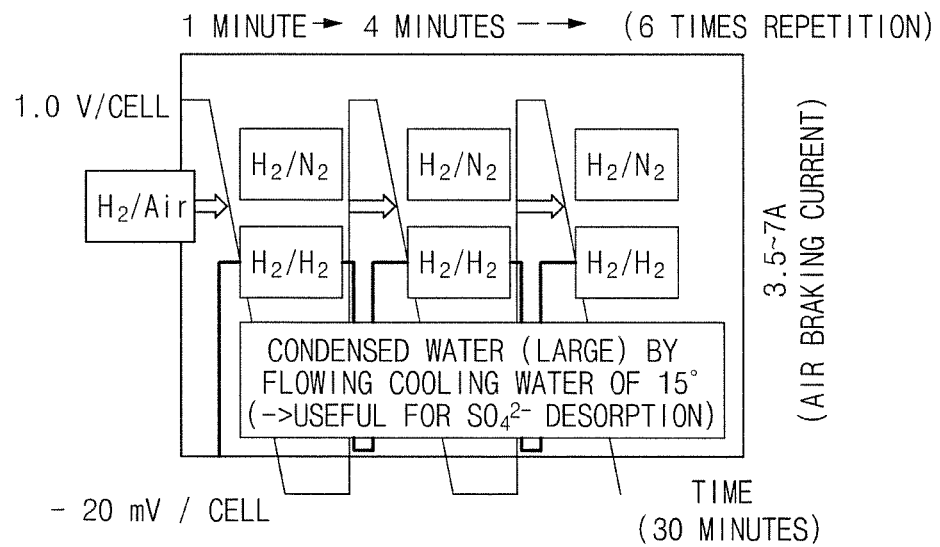
FIG. 3 is a graph illustrating a case in which an OCV ↔ hydrogen pumping reaction is performed in one electrode six times by a continuous pulse scheme, with respect to time, in the method for recovering performance of a fuel cell stack according to an exemplary embodiment of the present disclosure.

After the hydrogen pumping reaction is generated within the cathode, air is again supplied into the cathode to maintain the OCV for about 1 minute. The OCV ↔ hydrogen pumping reaction is preferably performed by a pulse scheme, preferably, about 5 to 10 times. FIG. 3 illustrates that the OCV ↔ hydrogen pumping reaction is performed, for example, six times.

A mechanism of removing the impurities adsorbed onto the platinum surface by maintaining the hydrogen pumping reaction and the OCV conditions in the cathode is shown in the following Table 1.

TABLE 1

Mechanism of recovering performance of an aged fuel cell stack by 'OCV ↔ hydrogen pumping reaction' (reaction mechanism in cathode under normal potential condition)

| Impurity Chemical Species | Reaction Mechanism | Additional Explanation |
| --- | --- | --- |
| Pt—OH/O | Pt—OH + H⁺ + e⁻ → Pt + H₂O<br>Pt—O + 2H⁺ + 2e⁻ → Pt + H₂O | Reduced at hydrogen pumping potential |
| Pt—SO$_x$ | Pt—SO$_x$ → Pt—S°$_{ads}$ | Reduction into sulfur at hydrogen pumping potential (about 0.05-0.1 V vs. SHE) |
| Pt—S | Pt—S + 4H₂O → Pt—SO₄²⁻ + 8H⁺ + 6e⁻ | Hydrated into sulfate form under OCV condition (0.9-1.3 V) |

TABLE 1-continued

Mechanism of recovering performance of an aged fuel cell stack by 'OCV ↔ hydrogen pumping reaction' (reaction mechanism in cathode under normal potential condition)

| Impurity Chemical Species | Reaction Mechanism | Additional Explanation |
|---|---|---|
| $Pt-SO_4^{2-}$ | $Pt-SO_4^{2-}$ or $Pt-(H)SO_4^- \rightarrow Pt$ | Desorbed at hydrogen pumping potential at which many droplets are present and discharged to outside of cell |

Figure 4:
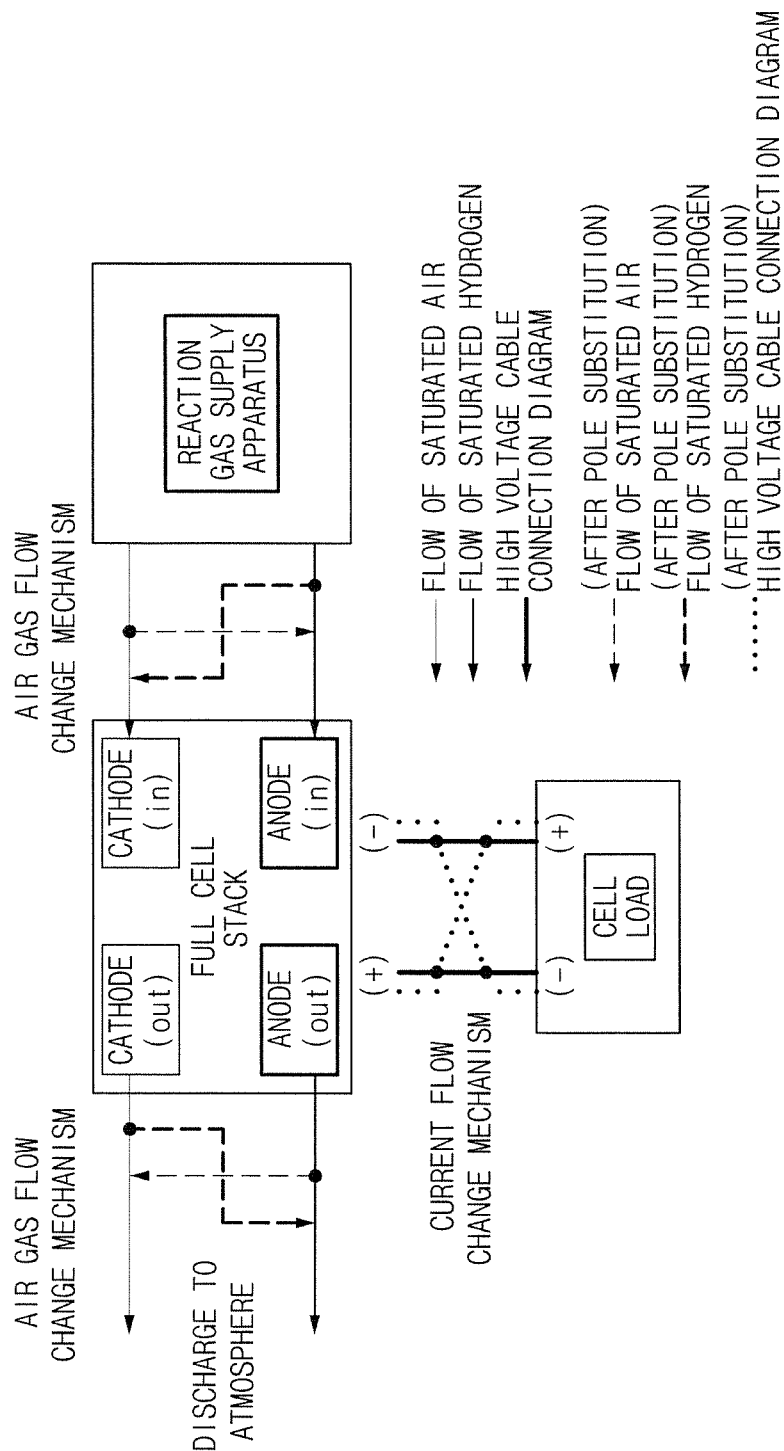
FIG. 4 is a diagram schematically illustrating an apparatus for recovering performance of a fuel cell stack according to an exemplary embodiment of the present disclosure.

The platinum oxides in the cathode and the sulfur oxide adsorbed onto the platinum surface may be removed by the OCV ↔ hydrogen pumping reaction. After the pulse reaction, a pole is substituted (anode ↔ cathode) to supply air to the anode before the pole substitution (cathode after the pole substitution) and hydrogen to the cathode before the pole substitution (anode after the pole substitution). In this case, according to the method and the apparatus for recovering performance of a fuel cell stack according to the exemplary embodiment of the present disclosure, a supply gas flow changing mechanism such as a 3-way valve for changing a flow of air and hydrogen without manually desorbing a pipe (pipe through which saturated air and saturated hydrogen are supplied) connected to the anode and the cathode every time is provided (see FIG. 4). Further, a high voltage cable (+)/(−) connected to the stack also needs to be dismantled depending on the changed and supplied reaction gas, replaced, and again connected. The apparatus for recovering performance of a fuel cell stack according to the exemplary embodiment of the present disclosure may include a current flow change mechanism such as a contact type relay to interlock a reaction gas flow supplied to the stack with a high voltage terminal pole, thereby automatically changing the gas flow (see FIG. 4).

According to the apparatus for recovering performance of a fuel cell stack of the exemplary embodiment of the present disclosure, the anode and the cathode are substituted with each other. After the pole is substituted, the saturated air of 65 to 75° C. and the cooling water of 10 to 15° C. are supplied to a cathode and after the pole substitution, the saturated hydrogen of 6 to 75° C. is supplied to the anode and then a load is applied to the cathode in the state in which the supply of air stops to generate the hydrogen pumping reaction in the cathode for about 2 to 10 minutes, preferably, 3 to 5 minutes. Next, air is again supplied to the cathode to maintain the OCV for about 0.5 to 1.5 minutes, preferably, 1 minute. Similar to the cathode before the pole substitution, the OCV ↔ hydrogen pumping reaction is performed about 5 to 10 times even in the cathode after the pole substitution by the pulse scheme, preferably, 6 times as illustrated in FIG. 3.

The mechanism of removing impurities adsorbed onto the platinum surface by maintaining the hydrogen pumping reaction and the OCV conditions in the cathode (anode under the normal potential conditions) after the pole is first substituted is shown in the following Table 2.

TABLE 2

Mechanism of recovering performance of an aged fuel cell stack by 'OCV ↔ hydrogen pumping reaction' (reaction mechanism in an anode under a normal potential condition)

| Impurity Chemical Species | Reaction Mechanism | Additional Explanation |
|---|---|---|
| Pt—CO | $Pt-CO + Pt-O \rightarrow 2Pt + CO_2$ | Desorbed by electrochemical reaction with oxygen supplied at the time of pole substitution |
| Pt—CO | $Pt-CO + OH_{ads} \rightarrow Pt + CO_2 + H^+ + e^-$ | Electrochemically desorb CO while reaching OCV at the time of pole substitution |
| $Pt-SO_3^-$ | $Pt-SO_3^- \rightarrow Pt$ | Desorbed at hydrogen pumping potential at which many droplets are present and discharged to outside of cell |

If the OCV ↔ hydrogen pumping reaction is performed in cycle for 30 minutes in the cathode under the normal potential conditions and for 30 minutes in the anode under the normal potential conditions and then the above process is performed in a total of 2 to 5 cycles (total required time: 2 to 5 hours), it could be appreciated that the recovery rate is a 10% increase in the recovery rate of performance of the fuel cell relative to the existing method.

Further, the apparatus for recovering performance of a fuel cell stack according to the exemplary embodiment of the present disclosure automatically substitutes the pole without artificially changing the position of the pipe/cable and continuously performs the hydrogen pumping to the anode and cathode to recover the catalyst activation of both electrodes, thereby considerably shortening the performance recovery time and cost.

Hereinafter, examples of the present disclosure will be described in more detail. However, these examples are to describe in more detail the present disclosure and the scope of the present disclosure is not limited thereto.

Example 1

Figure 5:
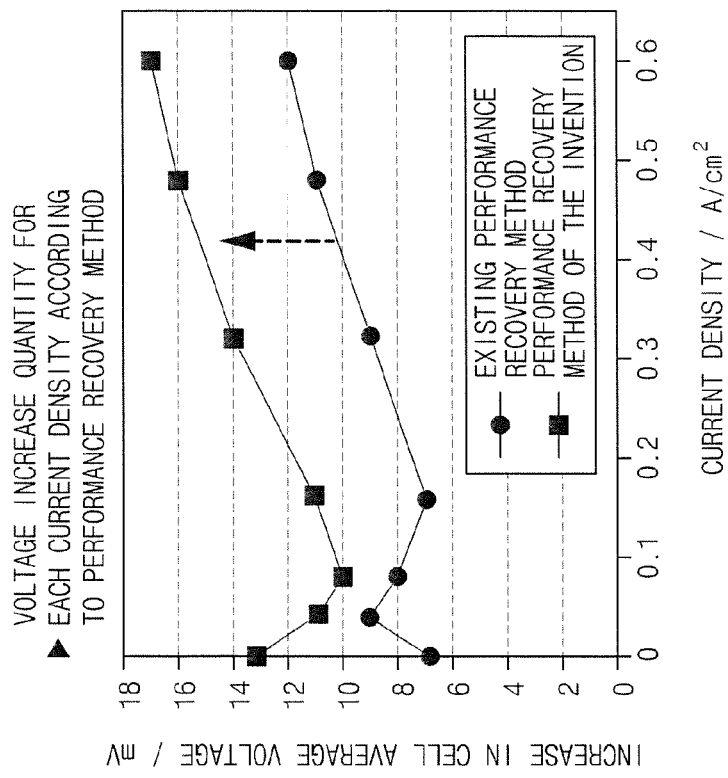
FIG. 5 is a pair of graphs illustrating recovery rates of performance and voltage increase quantities for each current density of the fuel cell stack according to the existing method and the exemplary embodiment of the present disclosure.
Figure 5:
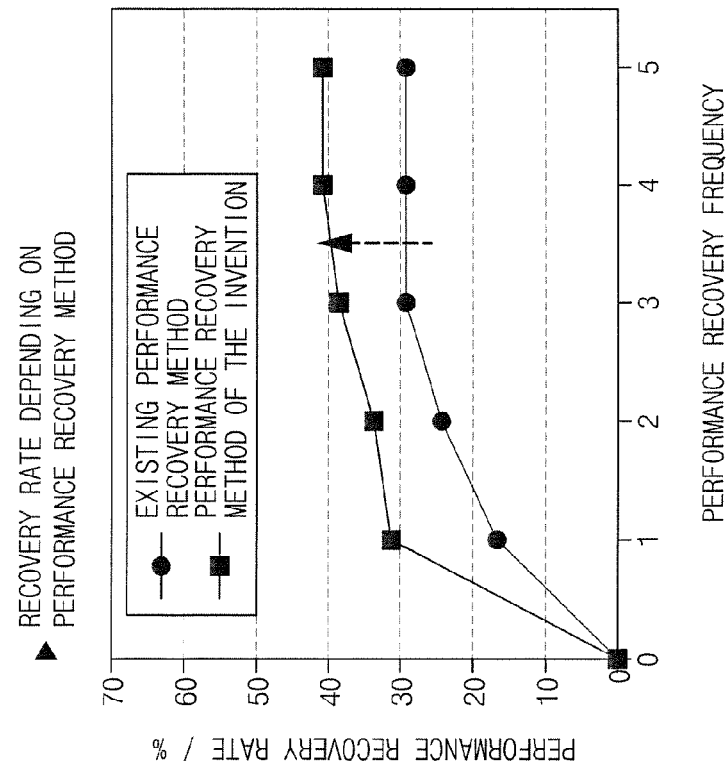

Recovery Rate and Voltage Increase Quantities of Fuel Cell Between the Existing Method and the Method of the Present Disclosure To determine how much the recovery rate is improved by comparing the method for recovering performance of a fuel cell stack according to the present disclosure with the existing method, the performance recovery frequency was performed 0 to 5 times and the result was shown in a graph of FIG. 5.

The performance recovery frequency of 1 time defines, as 1 time, a recovery cycle of about 1 hour which is a sum of the case in which the OCV ↔ hydrogen pumping reaction is performed 6 times (total required time: 30 minutes) in the cathode by the pulse scheme under the normal potential conditions with the case in which the OCV ↔ hydrogen pumping reaction is also performed 6 times (total required time: 30 minutes) in the anode by the pulse scheme under the normal potential conditions after the pole substitution, in the fuel cell stack aged due to the long-term use.

As the existing method, an air braking method (after the supply of hydrogen to the anode (at the same time, a stop of air supply), a method for continuously applying a load of 5 to 10 A to induce the hydrogen pumping to the cathode) was used to reduce the platinum oxides only in the cathode.

The aged fuel cell stack (@0.6 A/cm$^2$ stack) used in the experiment is the aged stack for a vehicle after the vehicle drives a distance of 6,500 km and the performance recovery was performed on upper/lower modules (Upper end of the method of the present disclosure vs. lower end of the existing method) and as a result of performing the method of the present disclosure and the existing method 1 to 5 times at a current density of 0.6 A/cm$^2$, it could be appreciated that the recovery rate of the case using the method of the present disclosure is 40.9% and the recovery rate of the case using the existing method is 29.3%, and therefore the recovery rate is increased as much as about 10%. The performance recovery rate indicates a voltage value recovered after the recovery as a percentage when a voltage drop of the aged stack is assumed to be as 100 on the basis of the performance at the time of the beginning of life (BOL). Further, it could be appreciated that about 30% is recovered only by performing the method of the present disclosure in 1 cycle under the same conditions. In this case, it could be appreciated that the time taken to reach a recovery rate of 30% is greatly shortened as compared to the existing method. The comparison of the primary recovery rate is disclosed in more detail in the following Example 2.

Further, as illustrated in the right graph of FIG. 5, it could be appreciated that in the case of using the method of the present disclosure, an average voltage of a plurality of cells is uniformly increased for each current density. Here, it could be appreciated that the current density is increased by 17 mV at the current density of 0.6 A/cm$^2$, which is more increased than 12 mV which is a voltage increase amount in the case of using the existing method under the same conditions.

Figure 6:
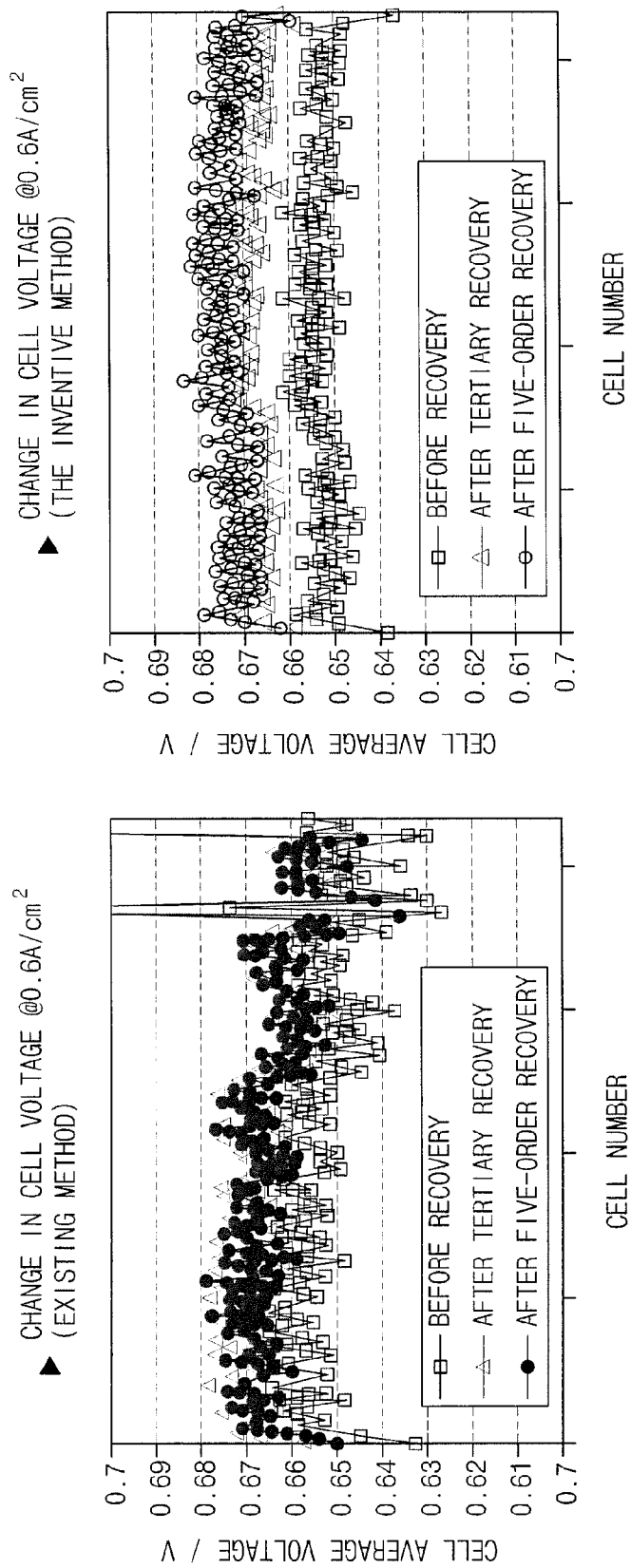
FIG. 6 is a pair of graphs illustrating a change in a cell voltage according to the existing method and the exemplary embodiment of the present disclosure.

Further, by reviewing the cell average voltages before the recovery of each of the plurality of cells, after 3 cycle recovery, and after 5 cycle recovery at the current density of 0.6 A/cm$^2$, it could be appreciated that the average voltage of each cell is high and a deviation in the average voltage between the cells is small, compared to the case of using the existing recovery method (see FIG. 6).

Example 2

Comparing Recovery Rates when a Method for Recovering Performance of Fuel Cell Stack of the Present Disclosure is Performed Only in 1 Cycle The Example 2 is the same as the above Example 1 except that the performance of the upper end module of the stack for a vehicle is recovered by the existing method and the performance of the lower end module is recovered by the method of the present disclosure and therefore comparing the method of the present disclosure with the existing method, each performance recovery method was performed only in 1 cycle.

The 1 cycle of the performance recovery method of the present disclosure means the primary performance recovery of performing the OCV ↔ hydrogen pumping reaction 6 times for 30 minutes in one electrode and then performing the OCV ↔ hydrogen pumping reaction for 30 minutes in the other electrode by substituting the pole, in which the total required time was about 1 hour.

The time required in 1 cycle of the existing method described in the above Example 1 was 3 hours.

Figure 7A:
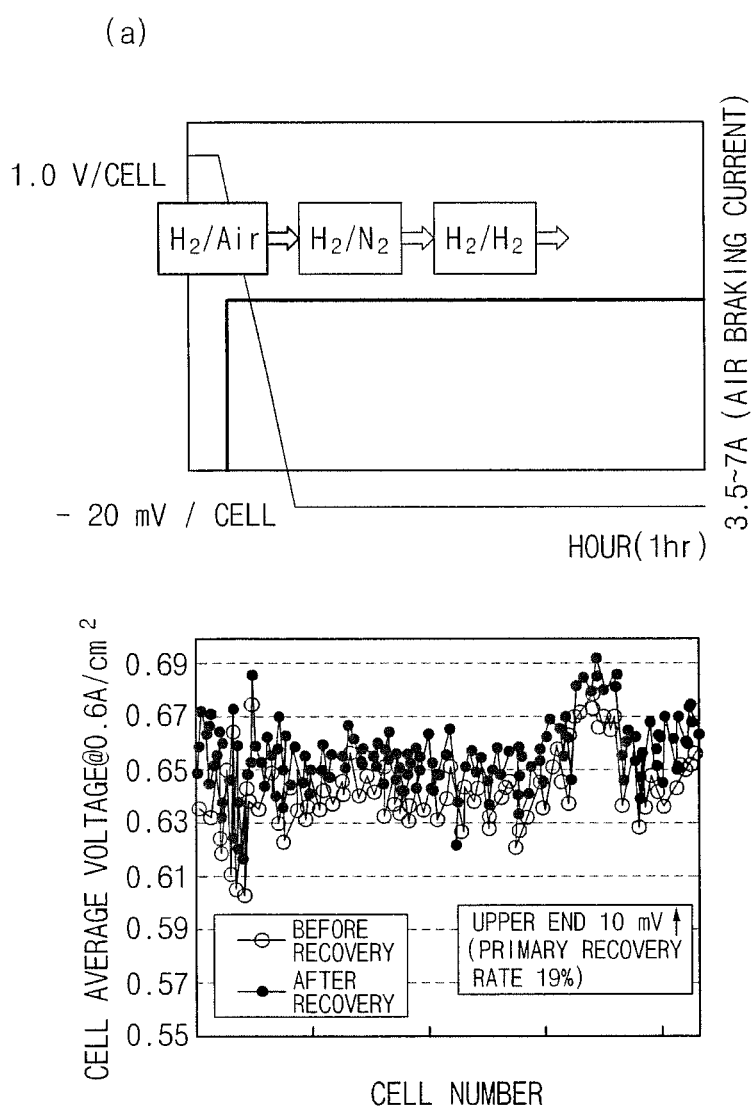
FIGS. 7A and 7B are pairs of graphs for comparing primary recovery rates after the existing method (a) and the exemplary embodiment (b) of the present disclosure are performed only in 1 cycle.
Figure 7B:
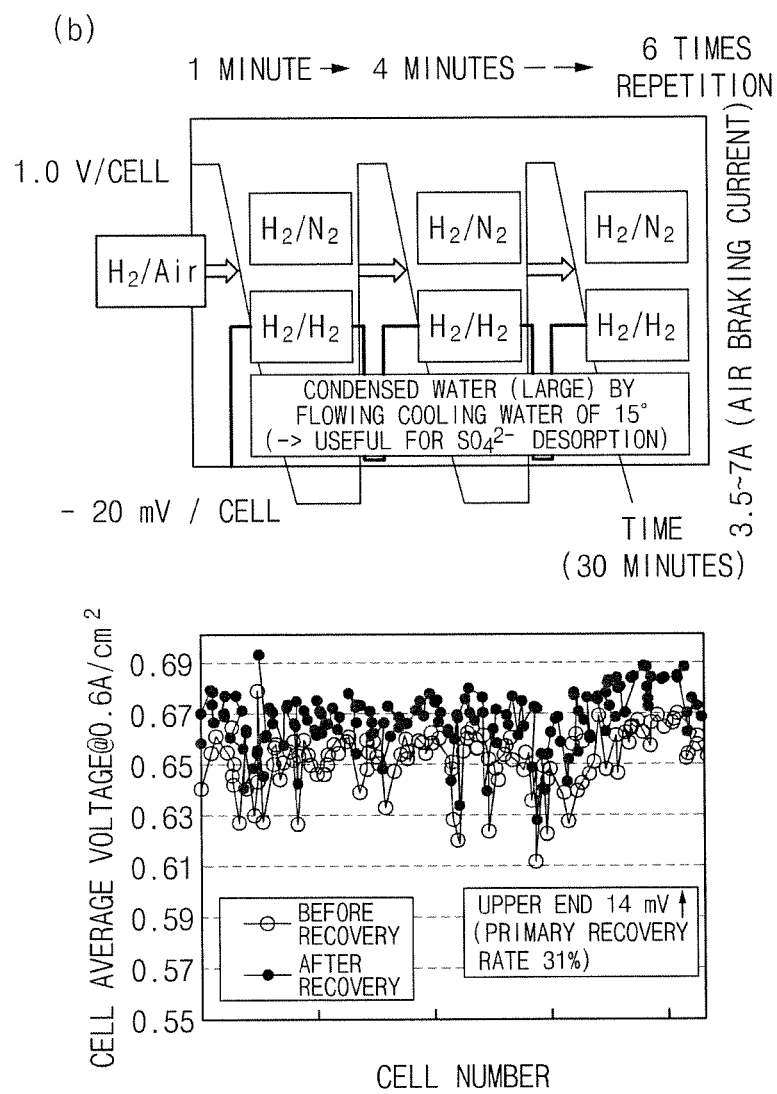

As illustrated in FIGS. 7A and 7B, the primary recovery rate of the case (7A) of using the existing method was about 19% and the primary recovery rate of the case (7B) using the method of the present disclosure was about 31% and therefore it could be appreciated that the recovery rate is greatly improved in the case of using the method of the present disclosure.

As described above, according to exemplary embodiments of the present disclosure, the method for recovering performance of a fuel cell stack according to the exemplary embodiments of the present disclosure may simultaneously remove the oxides of the platinum surface occurring during the use of the fuel cell stack and the impurities such as CO and sulfur oxides introduced from the outside of the stack to increase the recovery rate and the efficiency from that of the existing method for recovering performance of a fuel cell, thereby expanding the life of the fuel cell.

Although the preferred embodiments and application examples of the present disclosure have been disclosed for illustrative purposes, those skilled in the art will appreciate that the present disclosure is not limited to specific embodiments and application examples and various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:
1. A method for recovering performance of a fuel cell stack, comprising:
   1) a first pulse operation process including
      i) generating a hydrogen pumping reaction in a cathode by applying a current to the cathode after a supply of air to the cathode stops; and
      ii) maintaining an OCV (open circuit voltage) by again supplying air to the cathode after the hydrogen pumping is performed;
   2) a pole substitution process of substituting a pole of the fuel cell stack; and
   3) a second pulse operation process including
      iii) generating the hydrogen pumping reaction in the cathode after the pole substitution by applying a current to the cathode after the supply of air to the cathode stops after the pole substitution; and
      iv) maintaining the OCV (open circuit voltage) by supplying air to the cathode after the pole substitution after the hydrogen pumping is performed.

2. The method according to claim 1, wherein the first pulse operation process 1) repeatedly performs the steps of i) and ii).

3. The method according to claim 1, wherein the second pulse operation process 3) repeatedly performs the steps of iii) and iv).

4. The method according to claim 1, wherein the pole substitution process 2) and the second pulse operation process 3) are repeatedly performed.

5. The method according to claim 1, wherein the pole substitution process includes supplying hydrogen to an anode after the pole substitution and supplying air to the cathode after the pole substitution.

6. The method according to claim 5, wherein the supplied hydrogen is a saturated hydrogen of 65 to 75° C. and the supplied air is a saturated air of 65 to 75° C.

7. The method according to claim 5, wherein the air is supplied along with a cooling water of 10 to 15° C.

8. The method according to claim 1, wherein the generating of the hydrogen pumping reaction of step i) and step iii) includes continuously applying a load of 0.1 A/cm$^2$ for 3 to 5 minutes in a state in which the supply of air stops.

9. The method according to claim 1, wherein the maintaining of the OCV of step ii) and step iv) is performed for 0.5 to 1.5 minutes.

10. The method according to claim 1, wherein the first pulse operation process 1) and the second pulse operation process 3) is performed 6 times for a total of 30 minutes by a pulse scheme.

* * * * *